US012606265B2

(12) United States Patent
Uda et al.

(10) Patent No.: US 12,606,265 B2
(45) Date of Patent: Apr. 21, 2026

(54) DISPLAY APPARATUS FOR ELECTRIC MOTOR-ASSISTED BICYCLE, AND ELECTRIC MOTOR-ASSISTED BICYCLE

(71) Applicant: YAMAHA HATSUDOKI KABUSHIKI KAISHA, Iwata (JP)

(72) Inventors: Masatsugu Uda, Shizuoka (JP); Norihiro Morozumi, Shizuoka (JP); Ryohei Kitayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 730 days.

(21) Appl. No.: 17/579,852

(22) Filed: Jan. 20, 2022

(65) Prior Publication Data

US 2022/0242515 A1 Aug. 4, 2022

(30) Foreign Application Priority Data

Feb. 2, 2021 (JP) ................................. 2021-015237

(51) Int. Cl.
*B62J 50/22* (2020.01)
*B62J 50/21* (2020.01)
(Continued)

(52) U.S. Cl.
CPC ............. *B62J 50/22* (2020.02); *B62J 50/225* (2020.02); *B62K 23/00* (2013.01); *G06F 3/02* (2013.01); *G06F 3/14* (2013.01)

(58) Field of Classification Search
CPC ....... H04M 10/20; H01L 24/81; B62J 50/225; B62J 50/22; B60L 5/42; B62K 23/02;
(Continued)

(56) References Cited

U.S. PATENT DOCUMENTS 4,435,983 A 3/1984 Shimano
4,819,217 A * 4/1989 Houlihan ................. B62J 45/20
968/398

(Continued)

FOREIGN PATENT DOCUMENTS

CN 2717797 Y * 8/2005 ............. B62K 21/12
CN 204548374 U 8/2015
(Continued)

OTHER PUBLICATIONS

Original document (CN 2717797 ) with English translation; paragraphs added for citation purposes. (Year: 2025).*

*Primary Examiner* — John Olszewski
*Assistant Examiner* — Nathaniel William Watkins
(74) *Attorney, Agent, or Firm* — Keating & Bennett, LLP

(57) ABSTRACT

A display apparatus for an electric motor-assisted bicycle includes a tubular connecting pipe to allow a member coaxial with a steering axle of the electric motor-assisted bicycle to be inserted therein, and a display extending outward from the connecting pipe in a radial direction of the connecting pipe. The display includes a display surface to display a state of the electric motor-assisted bicycle and a button located on a surface of the display different from the display surface. A component of a depression direction of the button in a direction perpendicular to an axis of the connecting pipe is larger than a component in a direction of the axis of the connecting pipe.

11 Claims, 11 Drawing Sheets

(51) Int. Cl.
      *B62K 23/00*      (2006.01)
      *G06F 3/02*       (2006.01)
      *G06F 3/14*       (2006.01)
(58) Field of Classification Search
      CPC .......... B62K 5/00; B62K 11/00; B62K 23/00;
                  B62K 21/18; G06F 3/14; G06F 3/02;
                                          B63J 50/22
      See application file for complete search history.

(56)                  References Cited

U.S. PATENT DOCUMENTS

| | | | | |
|---|---|---|---|---|
| 4,847,454 | A * | 7/1989 | Hiruma ................... | H01H 9/06 |
| | | | | 200/61.85 |
| 4,862,395 | A * | 8/1989 | Fey et al. ............... | G06M 3/06 |
| | | | | 364/561 |
| 6,305,241 | B1 * | 10/2001 | Masui ................... | B62K 21/12 |
| | | | | 74/551.8 |
| 6,711,966 | B2 * | 3/2004 | Chuang ................... | B62J 6/03 |
| | | | | 74/551.8 |
| 2003/0230228 | A1 | 12/2003 | Kinoshita | |

| | | | | |
|---|---|---|---|---|
| 2005/0098979 | A1 | 5/2005 | Horiuchi | |
| 2006/0001233 | A1 | 1/2006 | Horiuchi | |
| 2006/0038377 | A1 | 2/2006 | Horiuchi | |
| 2006/0069499 | A1 * | 3/2006 | Suzuki et al. ......... | G01C 21/26 |
| | | | | 701/200 |
| 2014/0061270 | A1 | 3/2014 | Richter | |
| 2017/0101155 | A1 * | 4/2017 | Tachibana ............ | B62K 25/286 |
| 2017/0355412 | A1 * | 12/2017 | Takeshita ................ | B60L 50/20 |
| 2018/0203488 | A1 * | 7/2018 | Hawkins, III ......... | B62J 50/225 |
| 2019/0149645 | A1 * | 5/2019 | Montez ................... | B62J 43/30 |
| | | | | 455/556.1 |
| 2020/0207435 | A1 * | 7/2020 | Salvioli Mariani ........ | B62J 6/16 |
| 2022/0204110 | A1 * | 6/2022 | Silsby ..................... | B62J 45/20 |

FOREIGN PATENT DOCUMENTS

| | | |
|---|---|---|
| DE | 202004017041 U1 | 1/2005 |
| DE | 202009015929 U1 | 4/2011 |
| DE | 112021003116 T5 | 3/2023 |
| JP | 3635306 B2 | 4/2005 |
| JP | 2005-138827 A | 6/2005 |
| JP | 2015044465 A | 3/2015 |

* cited by examiner

DISPLAY APPARATUS FOR ELECTRIC MOTOR-ASSISTED BICYCLE, AND ELECTRIC MOTOR-ASSISTED BICYCLE

CROSS-REFERENCE TO RELATED APPLICATION

This application is based upon and claims the benefit of priority to Japanese Patent Application No. 2021-015237, filed on Feb. 2, 2021, the entire contents of which are hereby incorporated herein by reference.

BACKGROUND OF THE INVENTION

1. Field of the Invention

The present invention relates to a display apparatus for an electric motor-assisted bicycle.

2. Description of the Related Art

The number of bicycles with handlebars with an electronic device, such as cycle computer, mounted thereon has increased in recent years. For example, JP 2005-138827 A describes mounting various electronic control parts on the handlebars of a bicycle. This document discloses an arrangement in which part of a cycle computer is mounted inside the steering tube of a bicycle.

SUMMARY OF THE INVENTION

A display apparatus for an electric motor-assisted bicycle according to a preferred embodiment of the present invention includes a tubular connecting pipe to allow a member coaxial with a steering axle of the electric motor-assisted bicycle to be inserted therein; a display extending outward from the connecting pipe in a radial direction of the connecting pipe, the display including a display surface to display a state of the electric motor-assisted bicycle; and a button located on a surface of the display different from the display surface, wherein a direction of a depression operation of the button includes a component in a direction perpendicular to an axis of the connecting pipe that is larger than a component in a direction of the axis of the connecting pipe.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
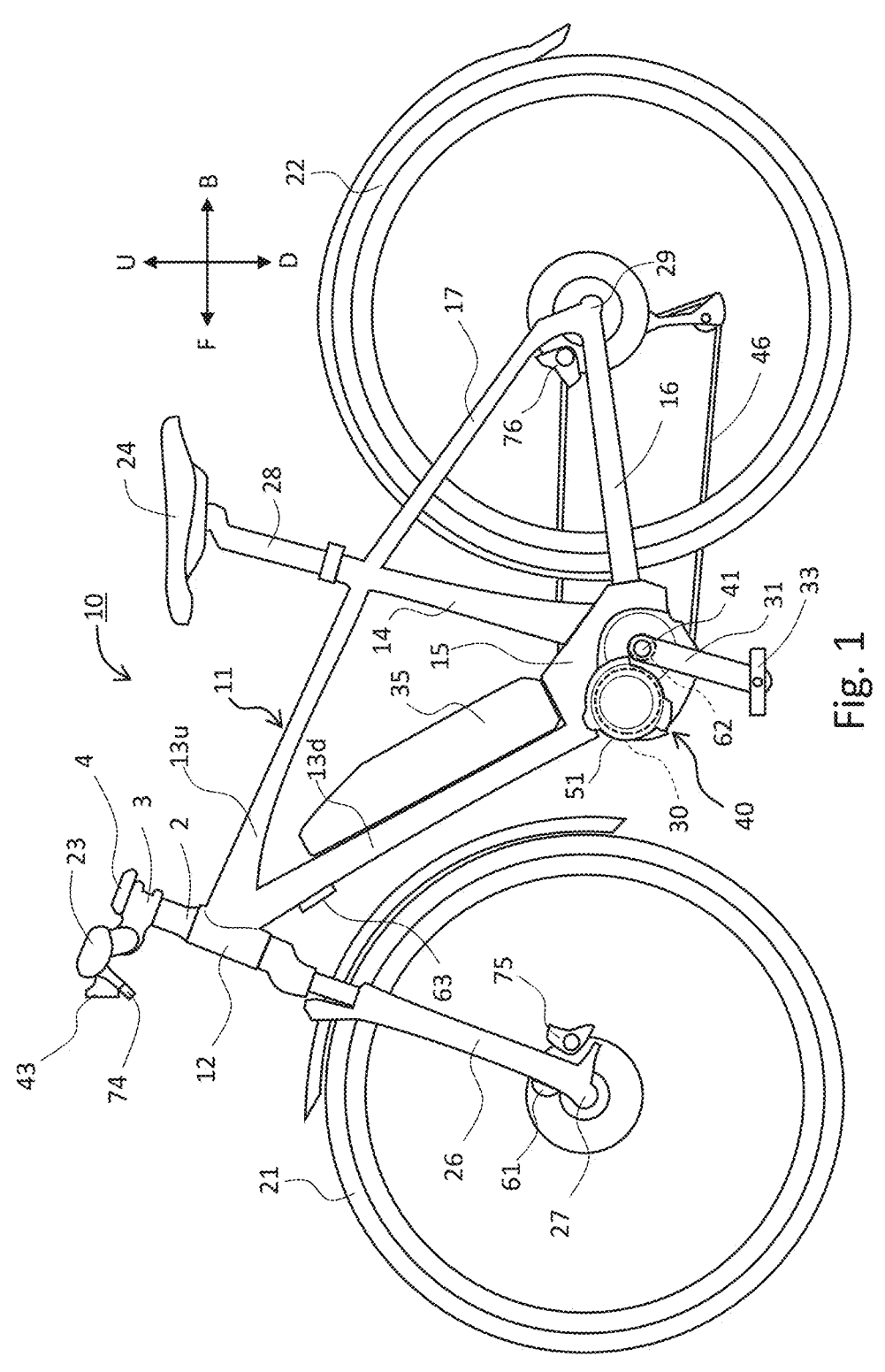
FIG. 1 is a left side view of an electric motor-assisted bicycle according to a preferred embodiment of the present invention.

A bicycle may be provided with an electronic device that is able to display information from a cycle computer, for example, and receive an input of the rider's operation. The inventors of preferred embodiments of the present invention investigated arrangements to allow electronic devices to be mounted on an electric motor-assisted bicycle. In the case of an electric motor-assisted bicycle, one indispensable device that provides functions specific to electric motor-assisted bicycles is a display apparatus that is able to display the state of the electric motor-assisted bicycle and receive an input of the rider's operation relating to assistance.

Aside from such display apparatuses specific to electric motor-assisted bicycles, the inventors did further research to discover an arrangement that would allow a cycle computer and other electronic devices to be mounted. During their research, the inventors considered the visibility, operability, and mounting arrangement of such devices and discovered that is it preferable to position a plurality of devices in the vicinity of the middle of the handlebars in a compact manner. If this is to be done, it is necessary to position these devices, including the display apparatus, of the electric motor-assisted bicycle in a limited space in the vicinity of the middle of the handlebars without these devices interfering with each other.

In view of this, it is preferable to provide a display apparatus for an electric motor-assisted bicycle and an electric motor-assisted bicycle that facilitate positioning of a plurality of devices in the vicinity of the middle of the handlebars without these devices interfering with each other.

Preferred embodiments of the prevent invention facilitate positioning of a plurality of devices in a vicinity of a middle of the handlebars of an electric motor-assisted bicycle without these devices interfering with each other.

A display apparatus for an electric motor-assisted bicycle according to a preferred embodiment of the present invention includes a tubular connecting pipe to allow a member coaxial with a steering axle of the electric motor-assisted bicycle to be inserted therein; a display extending outward from the connecting pipe in a radial direction of the connecting pipe, the display including a display surface to display a state of the electric motor-assisted bicycle; and a button located on a surface of the display different from the display surface, wherein a direction of a depression operation of the button includes a component in a direction perpendicular to an axis of the connecting pipe that is larger than a component in a direction of the axis of the connecting pipe.

In the above-described structural arrangement, the display apparatus includes a connecting pipe and a display extending in a radial direction of the connecting pipe. When the display apparatus is mounted on a member coaxial with the steering axle of the electric motor-assisted bicycle, the display extends from the steering axle in a radial direction. The circumferential position of the display about the steering axle may be adjusted by rotating the connecting pipe about its axis when mounted. Thus, the display surface is able to be positioned circumferentially about the steering axle with a high degree of freedom. Further, the button of the display is located on a surface different from the display surface such that the component of the direction of a depression operation in a direction perpendicular to the axis of the connecting pipe is larger than the component in the direction of the axis of the connecting pipe. The component of the direction of a load from a depression operation in a direction perpendicular to the steering axle is larger than the component in the direction of the steering axle. This simplifies the structure of the display so as to withstand a load in an axial direction of the connecting pipe. This allows a smaller display apparatus to be provided. Further, locating the button on a surface different from the display surface allows a smaller display surface to be provided. Thus, the display apparatus is able to save space and achieve a high degree of freedom of its circumferential position about the steering axle. Mounting a display apparatus with such a construction on an electric motor-assisted bicycle will facilitate positioning of a plurality of devices of the electric motor-assisted bicycle in the vicinity of the middle of the handlebars without these devices interfering with each other.

When the display apparatus has been mounted on the electric motor-assisted bicycle, the member coaxial with the steering axle has been inserted through the connecting pipe. That is, the connecting pipe is mounted on the member coaxial with the steering axle so as to surround the outer periphery of this member. In this situation, the connecting pipe is coaxial with the steering axle. The member coaxial with the steering axle on which the connecting pipe is mounted may be the steering axle itself, or may be another member coaxial with the steering axle. The member coaxial with the steering axle is supported by an appropriate element so as to be rotatable about the steering axle relative to the head pipe. For example, the connecting pipe is mounted on the steering axle or a member such as a stem.

The axial dimension of the connecting pipe may be smaller than its radial dimension. The connecting pipe may be annular (i.e., a ring) so as to surround the entire circumference of the member coaxial with the steering axle. Alternatively, a circumferential portion of the connecting pipe may be omitted such that the pipe surrounds a half or more of the circumference of the member coaxial with the steering axle.

The component of the direction of a depression operation of the button of the display apparatus in a direction perpendicular to the axis of the connecting pipe is larger than the component in the axial direction of the connecting pipe. Thus, the angle of the direction of a depression operation of the button relative to a plane perpendicular to the axis of the connecting pipe is below about 45°, for example. The angle of the direction of a depression operation is preferably not larger than about 30°, and more preferably not larger than about 20°, for example. The direction of a depression operation of the button may be perpendicular to the axis of the connecting pipe, for example. Such preferred embodiments include preferred embodiments where the direction of a depression operation is exactly perpendicular to the axial direction of the connecting pipe, as well as preferred embodiments where the direction of a depression operation is displaced from a plane perpendicular to the axis of the connecting pipe to a degree that allows the former (the direction of a depression operation) can be considered to be aligned with the latter (a plane perpendicular to the axis of the connecting pipe) for the purpose of addressing a load from a depression operation.

The angle of the direction in which the button of the display apparatus is depressed relative to the display surface is preferably smaller than about 45°, more preferably not larger than about 30°, and yet more preferably not larger than about 20°, for example. As the angle of the direction in which the button is depressed relative to the display surface is smaller, the display surface is not likely to be hidden by the rider's hand performing a depression operation. This allows a smaller display surface to be provided, facilitating miniaturization of the display apparatus. For example, if the angle of the direction in which the button is depressed relative to the display surface is 0° (including preferred embodiments where the angle is exactly 0° as well as preferred embodiments where the angle is slightly displaced from 0°, i.e., substantially perpendicular), the rider is able to depress the button from a side of the display surface.

The display may display the state of the electric motor-assisted bicycle using a display signal displayed on the display surface, wherein the display signal extends, as viewed in an axial direction of the connecting pipe, in an oblique direction relative to an imaginary line that extends through the axis of the connecting pipe and divides the display into two equal halves. In such preferred embodiments, the longitudinal direction of the display signal is oblique relative to the imaginary line.

The inventors have discovered that such a displayed signal extending in an oblique direction relative to the imaginary line extending through the axis of the connecting pipe and dividing the display into two equal halves is recognized more easily than a displayed signal extending parallel or perpendicularly to the imaginary line. The display apparatus may be mounted on the electric motor-assisted bicycle as rotated about the steering axle at a desired angle. As the display signal on the display is oriented in an oblique direction relative to the imaginary line, it is easily recognized regardless of the angle at which the display apparatus is mounted.

The display surface is one or more surfaces of the display that includes a region on which information is displayed. For example, if a display signal on the display is displayed on a display panel, such as a liquid-crystal panel or an organic EL panel, the surface of the display panel including the display region corresponds to the display surface. If the display signal is provided by light emission from a lamp, such as an LED lamp, the surface of the lamp including the light-emitting surface corresponds to the display surface.

A display signal on the display apparatus may be provided by a plurality of lamps (e.g., LEDs) arranged in an oblique direction relative to the imaginary line, or may be a linear image extending in the oblique direction. The angle of the direction of the display signal relative to the imaginary line is preferably not smaller than about 20°, more preferably not smaller than about 30°, and yet more preferably not smaller than about 40°. Further, the angle of the direction of the display signal relative to the imaginary line is preferably not larger than about 80°, more preferably not larger than about 70°, and yet more preferably not larger than about 60°.

It is preferable that the orientation of the display surface is close to the orientation of a plane perpendicular to the axial direction of the connecting pipe. This increases the visibility of the display surface for the rider when the display apparatus is mounted on the electric motor-assisted bicycle. In view of this, the angle between the display surface and a plane perpendicular to the axial direction of the connecting pipe is preferably about 0° to about 45°, and more preferably about 0° to about 30°, and yet more preferably about 0° to about 20°, for example. The display surface may be perpendicular to the axial direction of the connecting pipe, for example. Such preferred embodiments include preferred embodiments where the display surface is exactly perpendicular to the axial direction of the connecting pipe, as well as preferred embodiments where the display surface is displaced from a plane perpendicular to the axial direction of the connecting pipe to a degree that allows the former (the display surface) can be considered to be matched by the latter (a plane perpendicular to the axial direction of the connecting pipe) for the purpose of providing visibility.

As viewed in an axial direction of the connecting pipe, a line extending through a center of a depression surface of the button and in the direction of a depression operation may intersect the connecting pipe. If the button is thus oriented, the load from a depression operation of the button is received by the connecting pipe. This prevents the depression of the button of the display apparatus mounted on the electric motor-assisted bicycle from producing a moment that would rotate the display apparatus about the steering axle. This will simplify the load-bearing structure of the display apparatus.

The button may include a plurality of buttons located on the same surface of the display. In such preferred embodiments, the plurality of buttons may be oriented such that depression operations of the plurality of buttons are performed in the same direction, and depression surfaces of the plurality of buttons are displaced from one another in locations spaced apart in the direction of depression operation. This will enable efficient positioning of a plurality of buttons in a limited space while avoiding the ranges of operation of the plurality of buttons from interfering with one another.

If a plurality of buttons are provided, one of these buttons may be the power supply button for the electric motor-assisted bicycle, for example. The power supply button is used to switch the power supply of the drive system to control the assist force in the electric motor-assisted bicycle between on and off. If the depression surfaces of the plurality of buttons are displaced in position from one another in the direction of depression operation, the button whose depression surface protrudes farthermost in the direction of depression operation may be the power supply button.

The display apparatus may further include a connection port for an external terminal located in a surface of the display different from the display surface. The connection port may be oriented such that a direction in which the external terminal is inserted/removed through the connection port includes a component in a direction perpendicular to the axis of the connecting pipe that is larger than a component in the direction of the axis of the connecting pipe. Thus, the component of the direction of a load from an insertion/removal operation in a direction perpendicular to the axis of the connecting pipe is larger than the component in the axial direction of the connecting pipe. This will simplify the structure of the display apparatus to withstand a load in an axial direction of the connecting pipe.

The angle of the direction of insertion/removal of the external terminal through the connection port of the display apparatus relative to the display surface is preferably smaller than about 45°, more preferably not larger than about 30°, and yet more preferably not larger than about 20°, for example. As the angle of the direction of insertion/removal relative to the display surface is smaller, the display surface is not likely to be hidden by the rider's hand inserting or removing the external terminal. This allows a smaller display surface to be provided, facilitating miniaturization of the display apparatus. For example, if the angle of the direction of insertion/removal relative to the display surface is 0° (including preferred embodiments where the angle is exactly 0° as well as preferred embodiments where the angle is slightly displaced from 0°, i.e., substantially perpendicular), the rider is able to insert and remove an external terminal through a side of the display surface.

As viewed in an axial direction of the connecting pipe, the line extending through the center of the connection port and in the direction of insertion/removal may intersect the connecting pipe. If the connection port is thus oriented, the load from an insertion/removal operation of an external terminal through the connection port is received by the connecting pipe. This prevents the insertion/removal of the external terminal into/from the display apparatus mounted on the electric motor-assisted bicycle from producing a moment that would rotate the display apparatus about the steering axle. This will simplify the load-bearing structure of the display apparatus.

The display surface of the display may be located so as not to protrude from the connecting pipe upward in the axial direction of the connecting pipe. Thus, the display does not hamper operation by the rider. For example, in some preferred embodiments, the connecting pipe may be located on the steering axle of the electric motor-assisted bicycle below another member, such as a stem. In such preferred embodiments, if the display surface is located so as not to protrude upward along the axial direction of the connecting pipe, the display will not hamper operation by the rider of another member located above the connecting pipe.

The display may be detachable from the connecting pipe. This facilitates the work for mounting the display. The arrangement that makes the display detachable is not limited to any particular one. For example, the display may be detachably mounted on the connecting pipe with a fastener, such a bolt or a thread.

The display may be constructed such that the position of the display surface relative to the connecting pipe is changeable. This improves the degree of freedom of the position of the display. For example, the display may be rotatable about a pivot shaft relative to the connecting pipe and fixable at any angle within the range of rotation.

An electric motor-assisted bicycle including such a display apparatus is also encompassed by the preferred embodiments of the present invention. The electric motor-assisted bicycle includes a head pipe, a steering axle rotatably supported on the head pipe, a stem attached to an upper portion of the steering axle, and a pair of handlebars supported by the stem. The connecting pipe of the display apparatus is mounted on an outer periphery of the steering axle or the stem. The connecting pipe may be mounted on the outer periphery of the steering axle or stem in direct contact or may be mounted by another member, such as a spacer.

The display apparatus may be, for example, able to display the state of the electric motor-assisted bicycle and receive input of the rider's operation relating to electric-motor assistance in the electric motor-assisted bicycle. The electric motor-assisted bicycle may include a torque sensor to detect a pedal force on the pedal, a motor to generate an assist force to be added to the pedal force, and a motor controller to control the assist force by the motor depending on the pedal force. Further, the electric motor-assisted bicycle may include a battery to supply the motor with electric power. The display apparatus may receive electric power from the battery for operation. In such preferred embodiments, the display apparatus may include a power line connector to which a cable is connected to receive power supply from the battery.

Now, electric motor-assisted bicycles according to preferred embodiments of the present invention will be described with reference to the drawings. In the drawings, the same or corresponding elements are labeled with the same reference numerals, and their description will not be repeated. Further, the sizes of the components in the drawings do not exactly represent the sizes of the actual components, the size ratios between the components, or the like. In the description provided below, the directions "front/forward" and "rear(ward)", "left" and "right", and "top/up (ward)" and "bottom/down(ward)" of the electric motor-assisted bicycle refer to such directions as perceived by a rider sitting on the saddle (i.e., seat 24) and gripping the pair of handlebars 23. The directions "front/forward" and "rear (ward)", "left" and "right", and "top/up(ward)" and "bottom/down(ward)" of the electric motor-assisted bicycle are the same as such directions of the vehicle body and vehicle body frame of the electric motor-assisted bicycle. Furthermore, the forward direction of the electric motor-assisted bicycle is the same as the front-rear direction of the electric motor-assisted bicycle. The preferred embodiments described below are merely exemplary, and the present invention is not limited to the preferred embodiments described below.

FIG. 1 is a left side view of an electric motor-assisted bicycle 10 according to a preferred embodiment of the present invention. The characters F, B, U, and D in FIG. 1 indicate forward, rearward, upward, and downward, respectively.

As shown in FIG. 1, the electric motor-assisted bicycle 10 includes a vehicle body frame 11. The vehicle body frame 11 extends in the front-rear direction. The vehicle body frame 11 includes a head pipe 12, an upper frame portion 13u, a down frame portion 13d, a seat frame portion 14, a pair of chain stays 16, and a pair of seat stays 17. The head pipe 12 is located toward the front of the electric motor-assisted bicycle 10. The front ends of the down and upper frame portions 13d and 13u are connected to the head pipe 12. The down and upper frame portions 13d and 13u extend in the front-rear direction. The down and upper frame portions 13d and 13u extend obliquely downward. The upper frame portion 13u is located higher than the down frame portion 13d. The rear end of the upper frame portion 13u is connected to the seat frame portion 14. The rear end of the down frame portion 13d is connected to a bracket 15. The lower end of the seat frame portion 14 is connected to the bracket 15. The seat frame portion 14 extends upward and obliquely rearward from the bracket 15. It will be understood that the vehicle body frame 11 may not include the upper frame portion 13u.

A steering axle 2 is inserted into the head pipe 12 so as to be rotatable. A stem 3 is attached to an upper portion of the steering axle 2. Handlebars 23 are fixed to the stem 3. A front fork 26 is fixed to the lower end of the steering axle 2. A front wheel 21 is rotatably supported on the lower end of the front fork 26 by a wheel axle 27.

A grip is attached to each of the left and right ends of the handlebars 23. A left brake lever 74 is attached to a location on the handlebars 23 toward the left, whereas a right brake lever 74 is attached to a location on the handlebars 23 toward the right. The left brake lever 74 operates a brake 76 for the rear wheel 22. The right brake lever 74 operates a brake 75 for the front wheel 21.

A seat pipe 28 is inserted into the cylindrical seat frame portion 14. A seat 24 is provided on the upper end of the seat pipe 28. Thus, the vehicle body frame 11 rotatably supports the steering axle 2 at its front, and rotatably supports the rear wheel 22 at its rear. Further, the seat 24 and a drive unit 40 are attached to the vehicle body frame 11.

The pair of chain stays 16 are connected to the rear end of the bracket 15. The pair of chain stays 16 sandwich the rear wheel 22 from the left and right. The rear end of each of the chain stays 16 is connected to one end of the associated one of the seat stays 17. The pair of seat stays 17 sandwich the rear wheel 22 from the left and right. The other end of each of the seat stays 17 is connected to a location on the seat frame portion 14 toward its top. The rear wheel 22 is rotatably supported on the rear ends of the chain stays 16 by a wheel axle 29.

A vehicle speed sensor (i.e., speed sensor) 61 to detect rotation of the front wheel 21 is provided on the front fork 26. The vehicle speed sensor 61 includes, for example, a detected element that rotates together with the front wheel 21, and a detecting element fixed to the vehicle body frame 11 to detect rotation of the detected element. The detecting element detects the detected element in a mechanical, magnetic, or optical manner. The vehicle speed sensor 61 may detect rotation of a rotating body other than the front wheel 21 that rotates as the electric motor-assisted bicycle 10 advances forward, such as the rear wheel 22, motor 30, crankshaft 41, transmission gear, or chain. Further, the electric motor-assisted bicycle 10 may include, in addition to the vehicle speed sensor, a sensor to detect the state of the vehicle. The electric motor-assisted bicycle 10 may include, for example, an angular velocity sensor (e.g., gyro sensor) or an acceleration sensor.

The drive unit 40 is attached to the lower edge of the bracket 15 by fasteners (not shown). The drive unit 40 includes a housing 51 defining the exterior of the drive unit 40. A motor 30 is contained in the housing 51. In the preferred embodiment shown in FIG. 1, a crankshaft 41 extends through the housing 51 in the left-right direction. Alternatively, the crankshaft 41 may be located outside the drive unit 40.

A torque sensor 62 is provided around the crankshaft 41 to detect a pedal force applied by the rider. The torque sensor 62 detects torque that rotates the crankshaft 41 about its axis. The torque sensor 62 may be, for example, a non-contact torque sensor such as a magnetostrictive one, or a contact torque sensor such as an elastic-body variable detection-type one. A magnetostrictive torque sensor includes a magnetostrictive member that produces magnetostrictive effects and receives a rotational force of the crankshaft, and a detection coil that detects a change in magnetic permeability caused by a force from the magnetostrictive member.

Crank arms 31 are attached to the respective ends of the crankshaft 41. Pedals 33 are attached to the distal ends of the respective crank arms 31. The crankshaft 41 is rotated by the rider pressing the pedals 33. Although not shown, the electric motor-assisted bicycle 10 is provided with a driving sprocket that rotates together with the crankshaft 41 and a driven sprocket that rotates together with the rear wheel 22. A chain 46 is wound around the driving and driven sprockets to connect them. It will be understood that the chain 46 may be replaced by a belt, a shaft or the like.

A transmission mechanism (not shown) is provided within the drive unit 40 to transmit the rotation of the motor 30 to the driving sprocket (or chain 46). The transmission mechanism includes, for example, a decelerator (i.e., reduction gears). The decelerator reduces the rotational speed of the motor before transmission to the driving sprocket. Further, the transmission mechanism includes a synthesizing mechanism that synthesizes the rotation of the crankshaft 41 and the rotation of the motor 30 before transmission to the driving sprocket. The synthesizing mechanism includes a cylindrical member, for example. The crankshaft 41 is located within the cylindrical member. The driving sprocket is attached to the synthesizing mechanism. The synthesizing mechanism rotates about the same axis of rotation as the crankshaft 41 and driving sprocket. One-way clutches may be provided in the path of transmission of rotation from the crankshaft 41 to the synthesizing mechanism and the path of transmission of rotation from the motor 30 to the synthesizing mechanism. The rotational force transmitted from the motor 30 to the driving sprocket via the transmission mechanism constitutes the assist force by the motor 30.

The driving sprocket transmits a driving force to the rear wheel 22 via the chain 46. Specifically, the pedal force generated by the rider pressing the pedals 33 rotates the driving sprocket in the forward direction, and is transmitted, via the chain 46, as a driving force that rotates the rear wheel 22 in the forward direction. Further, the rotational force generated by operation of the motor 30 rotates the crankshaft 41 in the forward direction. Thus, the rotational force output by the motor 30 is added, as assistance, to the pedal force generated by the rider pressing the pedals 33.

Although not shown, the drive unit 40 includes a motor control device to control the motor. For example, an electronic device mounted on a board within the housing 51 of the drive unit 40 may define the motor control device. The electronic device includes, for example, a processor or an electronic circuit. The motor control device is electrically connected to the vehicle speed sensor, torque sensor, and motor.

A battery unit 35 is located on the down frame portion 13d. The battery unit 35 supplies the motor 30 of the drive unit 40 with electric power. The battery unit 35 includes a battery and a battery control unit, not shown. The battery is able to be charged and discharged. The battery control unit controls the charging and discharging of the battery and, at the same time, monitors output current, remaining capacity, and other information about the battery. It will be understood that the battery unit 35 may be located on the seat frame portion 14 or upper frame portion 13u.

Although not shown, the electric motor-assisted bicycle 10 may include a gearshift mechanism. The gearshift mechanism changes the gear ratio in response to an operation of a gearshift operation device by the rider. The gearshift operation device may be mounted on the handlebars 23, for example. The gearshift mechanism may include, for example, at least one of the driving and driven sprockets including a multi-gear sprocket. The multi-gear sprocket, around which the chain 46 is wound, enables switching in response to a rider operation of the gearshift operation device. The gearshift mechanism may be an external gearshift, or may be an internal gearshift.

Figure 2:
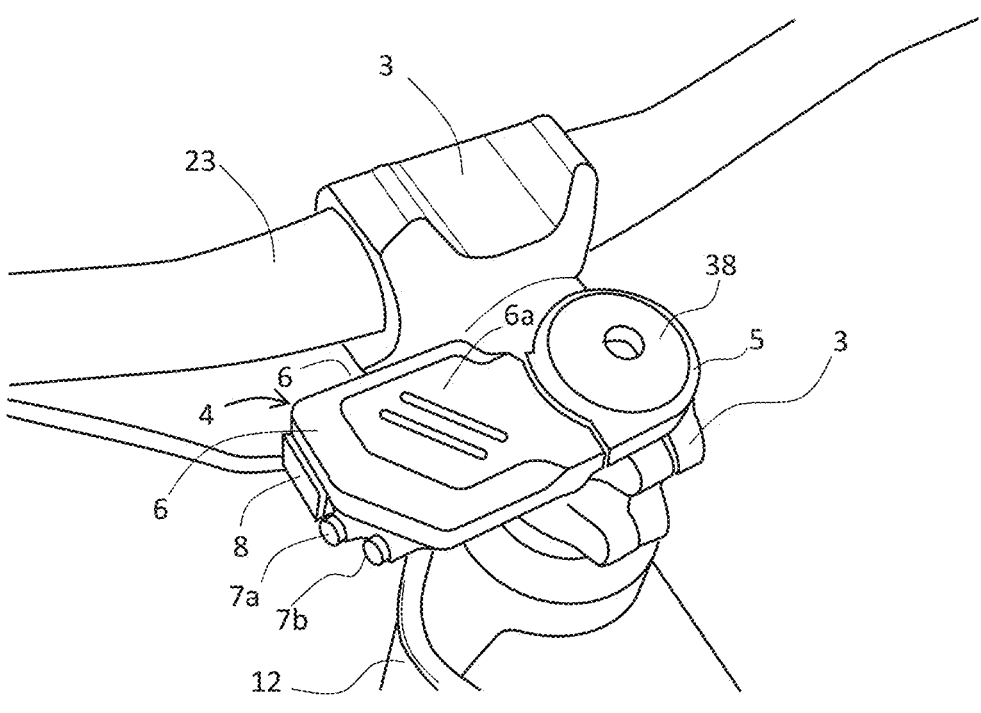
FIG. 2 is an enlarged perspective view of a display apparatus and nearby elements of the electric motor-assisted bicycle shown in FIG. 1.

In the electric motor-assisted bicycle 10 of the present preferred embodiment, a display apparatus 4 is mounted on a member coaxial with the steering axle 2. FIG. 2 is a perspective view of the display apparatus 4 and nearby elements mounted on the electric motor-assisted bicycle 10 of FIG. 1. The display apparatus 4 includes a connecting pipe 5 and a display unit 6. The connecting pipe 5 is mounted on the outer periphery of a member coaxial with the steering axle 2 (i.e., the steering axle 2 itself in the preferred embodiment of FIG. 2). The display unit 6 extends outward from the connecting pipe 5 in a radial direction of the connecting pipe 5. In the display apparatus 5 mounted on the electric motor-assisted bicycle 10, the axial direction of the connecting pipe 5 is the same as the axial direction of the steering axle 2.

Figure 3:
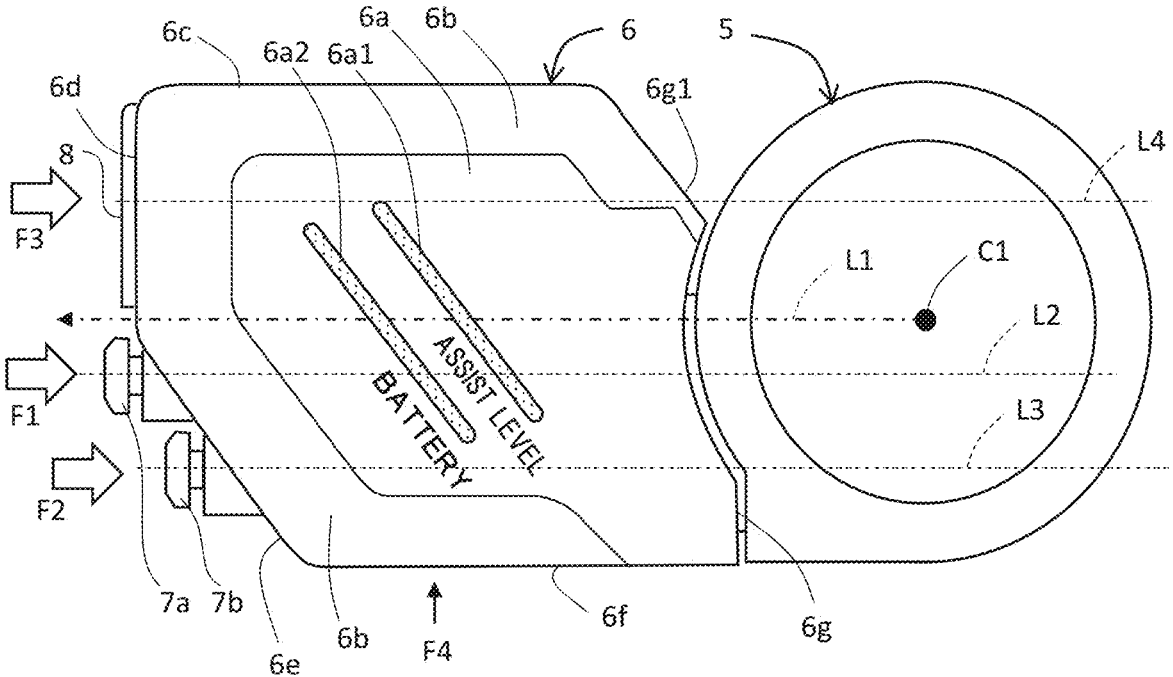
FIG. 3 is a plan view of the display apparatus according to a preferred embodiment of the present invention, illustrating an exemplary arrangement thereof.
Figure 4:
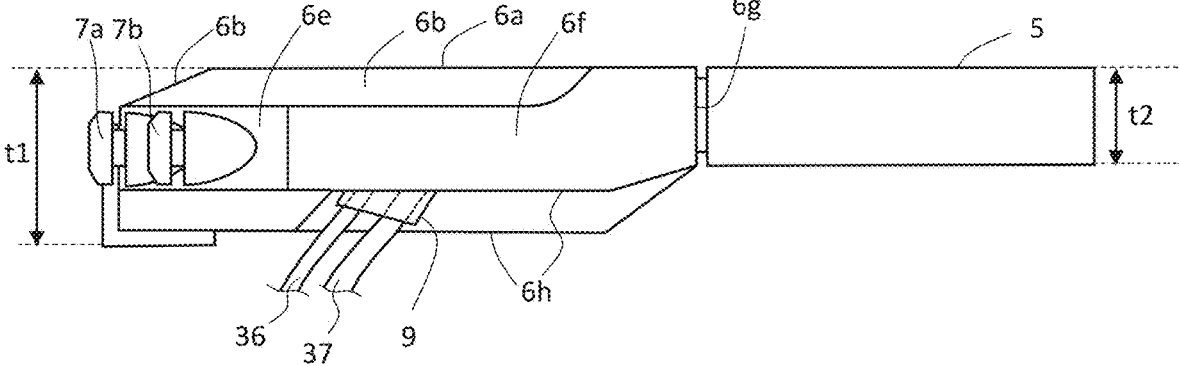
FIG. 4 is a side view of the display apparatus of FIG. 3 as viewed along arrow F4.
Figure 5:
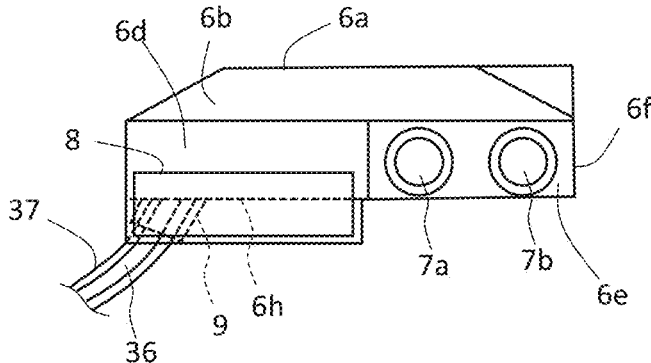
FIG. 5 is a side view of the display apparatus of FIG. 3 as viewed along arrow F1.

FIG. 3 is a plan view of the display apparatus 4 of FIG. 2 as viewed in an axial direction of the connecting pipe 5. FIG. 4 is a side view of the display apparatus 4 of FIG. 3 as viewed in the direction of arrow F4. FIG. 5 is a side view of the display apparatus 4 of FIG. 3 as viewed along arrow F1 (i.e., in the direction in which the button 7a is depressed).

In the preferred embodiment of FIG. 3, the display unit 6 includes a display surface 6a and buttons 7a and 7b. The display surface 6a displays the state of the electric motor-assisted bicycle 10. The buttons 7a and 7b are located on a surface different from the display surface 6a. The buttons 7a and 7b are depressible in a direction perpendicular to the axial direction of the connecting pipe 5. The buttons 7a and 7b are located such that a component of the direction of depression in the direction perpendicular to the axis of the connecting pipe 5 is larger than a component in the axial direction of the connecting pipe 5. This enables efficient positioning of the display surface 6a and buttons 7a and 7b and thus enables miniaturization of the display apparatus 4. If the buttons were located on the display surface 6a in a compact manner, a structure would be necessary that could withstand a load in the axial direction. This could hamper miniaturization of the size of the display apparatuses.

The direction perpendicular to the axial direction of the connecting pipe 5 is a direction in a plane perpendicular to the axial direction of the connecting pipe 5. The extended line (i.e., an imaginary line) in the direction of depression operation (i.e., direction of depression) of a button 7a, 7b does not necessarily cross the axis C1 of the connecting pipe 5. In the preferred embodiment of FIG. 3, the extended lines along arrows F1 and F2 are extended lines L2 and L3 from the buttons 7a and 7b in the direction of depression.

The display unit 6 is connected to the radially outer periphery of the connecting pipe 5. The display unit 6 and connecting pipe 5 extend in a direction perpendicular to the axis of the connecting pipe 5. For example, as in the preferred embodiment shown in FIG. 4, the thickness t2 of the connecting pipe 5, as measured in the axial direction, may be equal to or smaller than the thickness t1 of the display unit 6 in the axial direction. The thickness t2 is not limited to any particular value, and may be, for example, not larger than about 10 mm, and preferably not larger than about 5 mm. For the purpose of miniaturization, the thickness t1 of the display unit 6 is preferably not larger than about 5 times the thickness t2 of the connecting pipe 5, more preferably not larger than about 4 times, and yet more preferably not larger than about 3 times, for example.

The display unit 6 includes upper surfaces 6a and 6b, side surfaces 6c to 6g and 6g1, and a lower surface 6h. The upper surfaces include the display surface 6a. The buttons 7a and 7b are located on the side surface 6e. The buttons 7a and 7b may be located on a side surface other than the side surface 6e, such as the side surface 6c or 6f.

In the preferred embodiment shown in FIG. 3, at least a portion of the side surface 6g of the unit, which is located opposite to the side surface 6e having the buttons 7a and 7b as determined along the direction of depression, is connected to the connecting pipe 5. As viewed in an axial direction of the connecting pipe 5, the extended lines L2 and L3 passing through the centers (as determined along a direction perpendicular to the direction of depression) of the depression surfaces of the buttons 7a and 7b and extending in the direction of depression (indicated by arrows F1 and F2) cross the connecting pipe 5. That is, the imaginary lines passing through the centers of the depression surfaces of the buttons 7a and 7b and extending in the direction of depression intersect the connecting pipe 5. Thus, a load from depression of a button 7a, 7b is applied to the connecting pipe 5. The rider depressing the button 7a or 7b is not likely to produce a moment that would rotate the display unit 6 about the axis of the connecting pipe 5 (i.e., about the steering axle).

In the preferred embodiment shown in FIG. 3, a plurality of buttons, i.e., buttons 7a and 7b, are located on one and the same side surface 6e. These buttons 7a and 7b are depressed in the same direction. The depression surfaces of the buttons 7a and 7b are spaced apart from each other in the direction of depression. That is, the location of the depression surface of the button 7a and the location of the depression surface of the button 7b are different from each other as determined along the direction of depression. Thus, the operation surfaces of the buttons 7a and 7b are staggered. In the preferred embodiment shown in FIG. 3, the plurality of buttons 7a and 7b are located on the side surface 6e, which is inclined relative to the direction of depression. In a variation, the side surface 6e may be stepped and include two or more steps. In such preferred embodiments, each of the steps of the side surface may be provided with a button. The locations of buttons are not limited to a single surface. Buttons may be provided on a plurality of surfaces of the display apparatus 4.

The functions of the buttons 7a and 7b are not limited to any particular ones. Examples of functions of the buttons include turning on and off the power supply for the electric motor-assisted bicycle; turning on and off a light on the electric motor-assisted bicycle (e.g., headlight 43 or tail light); switching among levels of assistance in the electric motor-assisted bicycle; and switching among travel modes of the electric motor-assisted bicycle, where two of these functions may be assigned to the buttons 7a and 7b.

For example, the one of the plurality buttons provided on the display unit 6 located closest to the imaginary line L1 that crosses the axis C1 of the connecting pipe 5 and divides the display surface 6a into two equal halves (i.e., the button closest to the middle) may be the power supply button. Thus, an unintended pushing of the power supply button by the knee of the rider is not likely to occur. Further, the power supply button is provided at a location that makes it easy for the rider to push the power supply button when he/she intends to do so.

For another purpose, one of the plurality of buttons located radially farther outward (i.e., at a location more distant from the connecting pipe 5) may be the power supply button. This improves the operability of the power supply button, which is frequently operated. In such preferred embodiments, such function settings for the power supply button may be made that a power-off occurs when the power supply button has been pressed for a longer time, for example. Thus, an unintended operation of the power supply button is not likely.

In the preferred embodiment shown in FIG. 4, the display surface 6a is perpendicular to the side surface 6e having the buttons 7a and 7b. That is, the display surface 6a is perpendicular to the axis of the connecting pipe 5. Thus, the display surface 6a may be located to make it easy for the rider to observe. It will be understood that the display surface 6a may be inclined relative to a plane perpendicular to the axial direction of the connecting pipe 5 to a degree that provides easy visibility. In the preferred embodiment shown in FIGS. 3 and 4, the angle of the direction of depression of the buttons 7a and 7b, indicated by arrows F1 and F2, relative to the display surface 6a may be 0° or about 0°, for example. Thus, the rider is able to depress the buttons from a side of the display surface 6a.

In the preferred embodiment shown in FIG. 4, the upper surfaces of the display apparatus 4 includes an inclined surface 6b between the display surface 6a and the side surface 6e including the buttons 7a and 7b. The inclined surface 6b is inclined relative to both the display surface 6a and the side surface 6e. The inclined surface 6b is inclined in such a manner that the thickness of the display unit 6 decreases as it extends closer to the side surface 6e. The inclined surface 6b makes the buttons 7a and 7b easy for the rider to recognize.

As in the preferred embodiment shown in FIGS. 3 to 5, the display apparatus 4 may further include a connection port 8 for an external terminal. The connection port 8 is located on a surface different from the display surface 6a. The connection port 8 is oriented such that a component of the direction of insertion/removal an external terminal through the connection port 8 (indicated by arrow F3) in the direction perpendicular to the axis of the connecting pipe 5 is larger than a component in the axial direction of the connecting pipe 5. The direction of insertion/removal is determined by the geometry of the inner surfaces of the connection port 8. Since the direction of insertion/removal through the connection port 8, in addition to the direction of depression of the buttons 7a and 7b, is a direction perpendicular to the axis of the connecting pipe 5, the structure of the display apparatus 4 that withstands a load in an axial direction of the connecting pipe 5 is simplified.

The connection port 8 is used to connect an external electronic device to the display apparatus 4. Although not limiting, the connection port 8 may be for a USB terminal, for example. For example, the connection port 8 may be an external power supply port to supply an external device with electric power from the display apparatus 4.

The location of, and the direction of insertion/removal through, the connection port 8 may be such that the extended line L4 passing through the center of the connection port (i.e., the center as viewed in the direction of insertion/removal) and extending in the direction of insertion/removal crosses the connecting pipe 5. In the preferred embodiment shown in FIG. 3, of the side surfaces 6g and 6g1 located opposite to the side surface 6d having the connection port 8 as determined along the direction of insertion/removal, at least one side surface 6g is connected to the connecting pipe 5. Thus, a load from an insertion/removal operation of an external terminal is received by the connecting pipe 5. Thus, connecting or removing an external terminal through the connection port 8 is unlikely to cause a moment that would rotate the display apparatus 4 about the steering axle 2.

The connection port 8 is located on the side surface 6d. The side surface 6d is located next to the side surface 6e having the buttons 7a and 7b. The side surface 6e for the buttons 7a and 7b is inclined relative to the side surface 6d for the connection port 8. Thus, the connection port 8 and the buttons 7a and 7b are located on two surfaces that are different from the display surface 6a and are located next to each other and not parallel to each other, thus enabling efficient location of the connection port 8 and buttons 7a and 7b while providing good removal/insertion and depression operability. In the preferred embodiment shown in FIGS. 3 and 4, the angle of the direction of insertion/removal of an external terminal through the connection port 8, indicated by arrow F3, relative to the display surface 6*a* is 0° or about 0°, for example. The rider is able to insert and remove an external terminal through the connection portion 8 from a side of the display surface 6*a*.

The display apparatus 4 includes a connector 9 to which a power supply cable 37 is connected. The connector 9 is located on a different surface from the display surface 6*a* and from the surface having the buttons 7*a* and 7*b* (i.e., side surface 6*e*). In the preferred embodiment shown in FIGS. 4 and 5, the connector 9 is located on the lower surface 6*h*, which is located opposite to the display surface 6*a* as determined along the axial direction of the connecting pipe 5. The connector 9 includes a hole inclined relative to the axial direction of the connecting pipe 5. The power supply cable 37 is inserted into the connector 9 in a direction oblique relative to the axial direction of the connecting pipe 5. In other words, the connector 9 is a removal port through which the power supply able 37 is removed from the display apparatus 4 in a direction oblique relative to the pipe axis. This prevents the power supply cable 37 from interfering with another device or member above and below the connecting pipe 5 of the display apparatus 4 as determined along the axial direction. In the preferred embodiment shown in FIGS. 4 and 5, the power supply cable 37 is removed in an oblique direction relative to the lower surface 6*h*.

In the preferred embodiment shown in FIGS. 4 and 5, in addition to the power supply cable 37, an external device (e.g., a switch unit) connection cable 36 is connected to the connector 9. Similar to the power supply cable 37, the external device connection cable 36 is removed from the display apparatus 4 in a direction oblique relative to the axial direction of the connecting pipe 5. It will be understood that at least one of the power supply cable 37 and external device connection cable 36 may be omitted.

Figure 6:
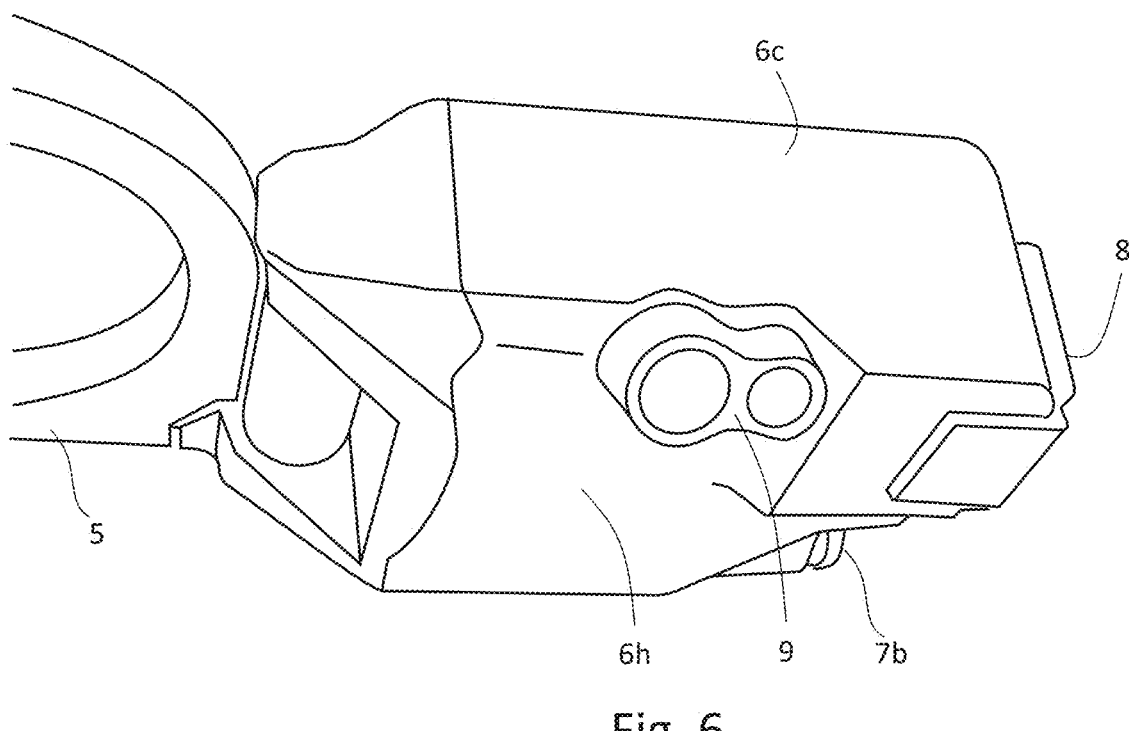
FIG. 6 is a perspective view of the display apparatus of FIG. 3 as viewed from below.

FIG. 6 is a perspective view of the display apparatus 4 of FIGS. 3 to 5 as viewed from below. FIG. 6 does not show the power supply cable 37 and external device connection cable 36. In the preferred embodiment shown in FIG. 6, the connector 9 includes a cable removal port including a hole recessed in an oblique direction relative to the lower surface 6*h*. The connector 9 is located at an edge portion of the lower surface 6*h* and is oriented to allow the power supply cable 37 to be removed in an oblique direction from the edge portion toward the outside.

Returning to FIG. 3, the display apparatus 6 indicates the state of the electric motor-assisted bicycle 10 using the display signals 6*a*1 and 6*a*2 indicated on the display surface 6*a*. As viewed in an axial direction of the connecting pipe 5, the indicated display signals 6*a*1 and 6*a*2 extend in an oblique direction relative to the imaginary line L1 that passes through the axis C1 of the connecting pipe 5 and divides the display surface 6*a* into two equal halves. Since the display signals 6*a*1 and 6*a*2 are oriented to extend in an oblique direction relative to the imaginary line L1, the rider is able to easily recognize information indicated by the display signals 6*a*1 and 6*a*2 regardless of the angle at which the display apparatus 4 is mounted.

Each of the display signals 6*a*1 and 6*a*2 may indicate a condition of the vehicle based on their length as measured in the direction of extension oblique relative to the imaginary line L1. In the preferred embodiment shown in FIG. 3, the length of the display signal 6*a*1 in the direction of extension indicates the level of assistance added to the pedal force, and the length of the display signal 6*a*2 indicates the remaining capacity of the battery. The display unit 6 may include lamps such as LEDs, or may include a display such as an LCD. The display signals 6*a*1 and 6*a*2 may display information using linear lamps or linear images on the display, for example.

Figure 7:
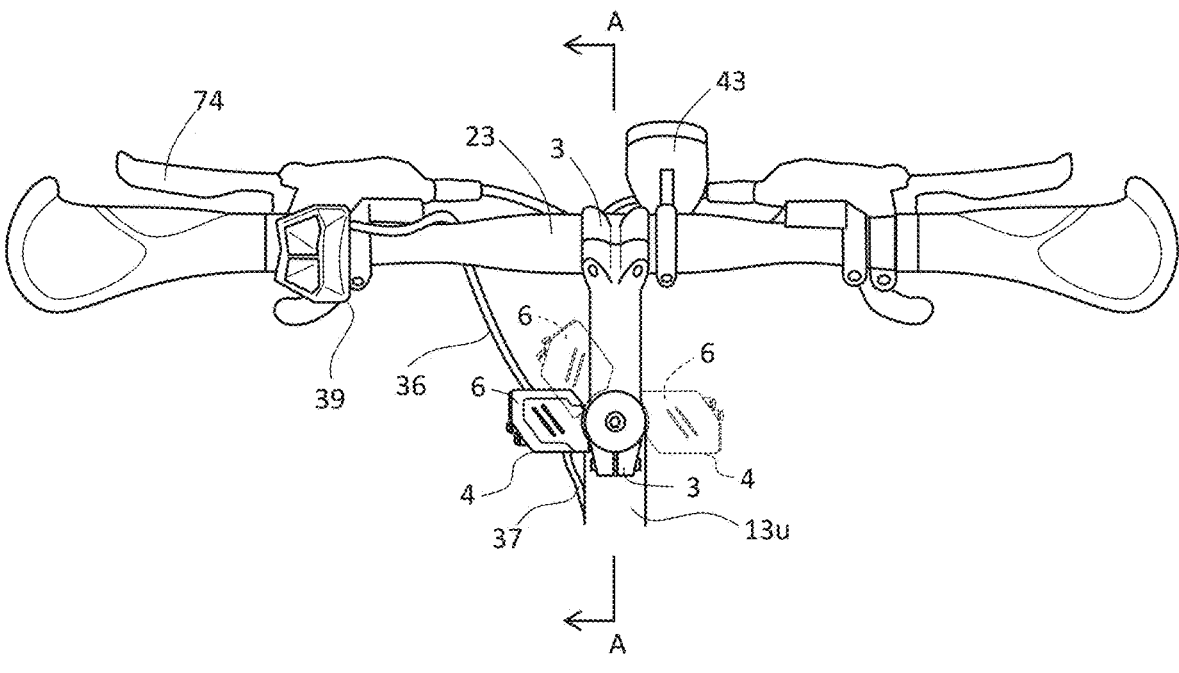
FIG. 7 shows handlebars and nearby elements of the electric motor-assisted bicycle as viewed in an axial direction of the steering axle.

FIG. 7 shows the handlebars and nearby elements of the electric motor-assisted bicycle on which the display apparatus 4 is mounted as viewed in an axial direction of the connecting pipe 5 (i.e., the axial direction of the steering axle 2). In FIG. 7, broken lines indicate variations of the display apparatus 4 modified with respect to its mounting position. As shown in FIG. 7, the circumferential position of the display unit 6 about the steering axle 2 is able to be adjusted by rotating the connecting pipe 5 about its axis when mounted. This makes it easier to avoid interference between the display apparatus 4 and other devices located at or near the middle of the handlebars.

As shown in FIG. 3, the display unit 6 displays the display signals 6*a*1 and 6*a*2 extending in an oblique direction relative to the imaginary line L1. Since the display signals 6*a*1 and 6*a*2 are oriented in an oblique direction, the display signals 6*a*1 and 6*a*2 are easy to observe regardless of the circumferential position of the display unit 6 about the steering axle 2. For example, since the display signals 6*a*1 and 6*a*2 are oriented in an oblique direction, information indicated by the display signals 61*a* and 6 as is easily discerned regardless of whether the display unit 6 is located in front of the stem 3, behind the stem 3, to the right of the stem 3, or to the left of the stem 3 as viewed by the rider.

In the preferred embodiment shown in FIG. 7, a switch unit 39 is attached to the handlebars 23. The switch unit 39 receives the rider's operation to switch among levels of assistance of the electric motor-assisted bicycle 10. The switch unit 39 includes a switch that switches among the levels of assistance. The switch unit 39 is attached to the handlebars 23 near one of the grips. The rider is able to operate the switch on the switch unit 39 with his/her hand grasping that grip of the handlebars 23. The switch unit 39 is connected to the display apparatus 4 via the external device connection cable 36.

Alternatively, the switch unit 39 may be integral with the display apparatus 4. For example, the display apparatus 4 may include a switch to switch among the levels of assistance. Alternatively, one of the buttons 7*a* and 7*b* of the display apparatus 4 may be the button to switch among the levels of assistance. In such preferred embodiments, an external device connection cable 36 is not necessary.

The display apparatus 4 is supplied with electric power by the battery unit 35 via the power supply cable 37. The display apparatus 4 may be supplied with electric power by the battery unit 35 via the drive unit 40. In such preferred embodiments, the display apparatus 4 is connected to the drive unit 40 via the power supply cable 37. In addition to supplying electric power, the power supply cable 37 may transmit control information. For example, the display apparatus 4 may notify the drive unit 40 of operation information input through the switch unit 39 via the power supply cable 37. Further, the apparatus may receive from the drive unit 40 information on the state of the electric motor-assisted bicycle 10. Further, the display apparatus 4 may be connected to the headlight 43 mounted on the electric motor-assisted bicycle 10. In such preferred embodiments, the headlight 43 may be switchable between on and off through the buttons 7*a* and 7*b* on the display apparatus 4. The headlight 43 may be attached to a front portion of the electric motor-assisted bicycle 10, such as the handlebars 43, stem 3, head pipe 12, or front fork 26, for example.

Figure 8:
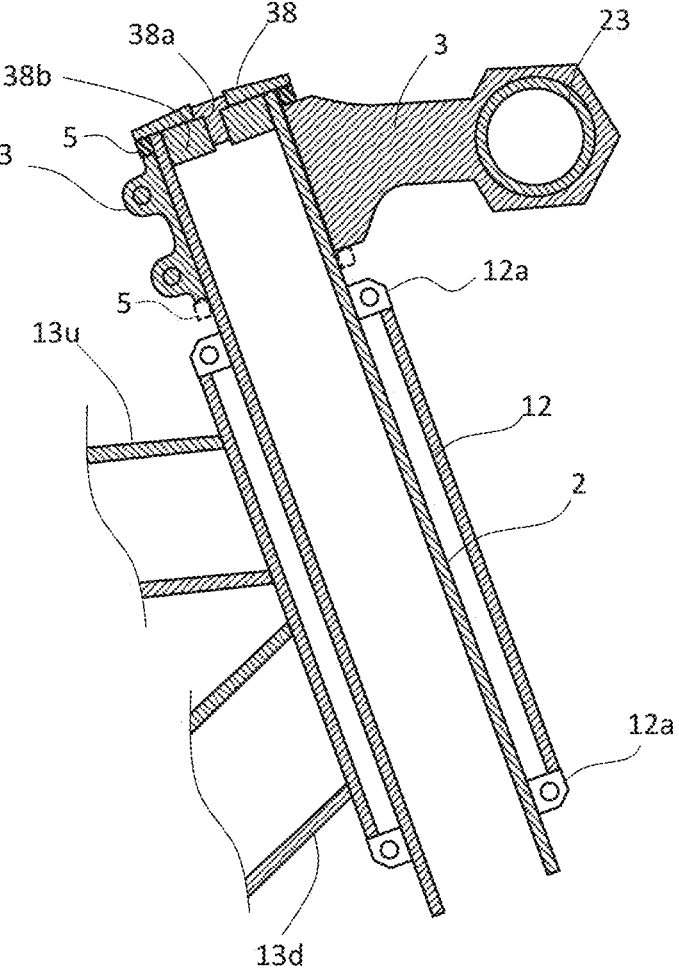
FIG. 8 is a cross-sectional view of some elements in FIG. 7, taken along line A-A.

FIG. 8 is a cross-sectional view of some elements in FIG. 7, taken along line A-A. In the preferred embodiment shown in FIG. 7, a bearing 12*a* (i.e., a headset) is attached to the head pipe 12 to rotatably support the steering axle. The stem 3 is mounted through clamping on an upper portion of the steering axle 2 rotatably supported by the head pipe 12. The stem 3 extends forward from the steering axle 2. The handlebars 23 are inserted through the forwardmost portion of the stem 3. The upper end of the steering axle 2 is closed by a top cap 38. The top cap 38 is fixed by a fastener 38_a_ to an anchor 38_b_ embedded inside the upper end of the steering axle 2.

The connecting pipe 5 of the display apparatus 4 is located above the stem 3 to surround the outer periphery of the steering axle 2. The steering axle 2 extends through the connecting pipe 5. The connecting pipe 5 is located between the stem 3 and top cap 38 and fixed therebetween. That is, the connecting pipe 5 is secured by the top cap 38 so as not to slip off the steering axle 2.

In the preferred embodiment shown in FIG. 8, the connecting pipe 5 of the display apparatus 4 is mounted above the stem 3. The mounting of the display apparatus 4 is not limited to this location. For example, the connecting pipe 5 may be positioned at a location indicated by broken lines in FIG. 8, that is, between the stem 3 and the head pipe 12.

Figure 9:
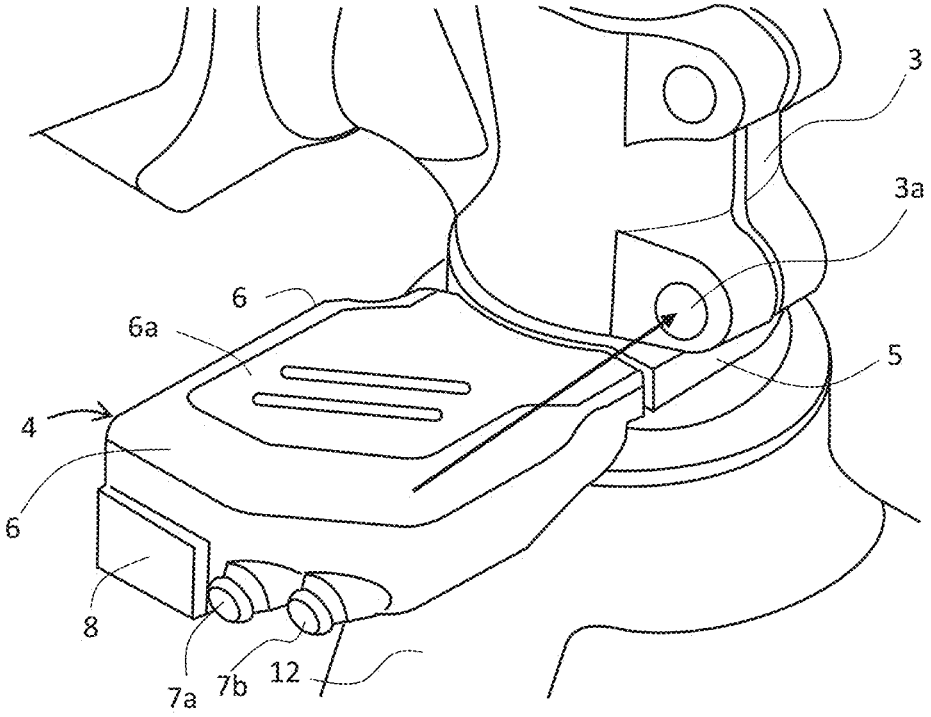
FIG. 9 is a perspective view of a variation of the display apparatus, modified with respect to its mounting position.

FIG. 9 is a perspective view of a preferred embodiment with the display apparatus 4 mounted below the stem 3. In the preferred embodiment shown in FIG. 9, the connecting pipe 5 of the display apparatus 4 is in contact with the lower end of the stem 3. It will be understood that another member, such as a spacer, may be inserted between the lower end of the stem 3 and connecting pipe 5. In the preferred embodiment shown in FIG. 9, the display surface 6_a_ of the display apparatus 4 does not protrude from the connecting pipe 5 upwardly along the axial direction of the connecting pipe 5. This provides space needed to allow the rider to operate the fastener 3_a_ of the stem 3 above the connecting pipe 5. The rider's operation of the fastener 3_a_ of the stem 3 is not hampered by the display apparatus 4.

Figure 10:
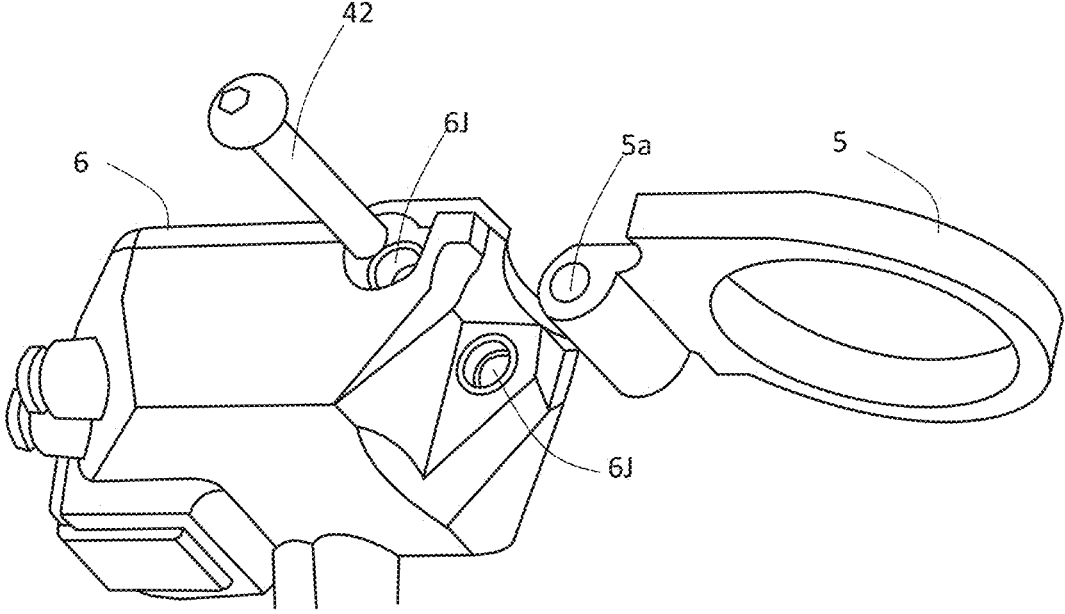
FIG. 10 is a perspective view of an exemplary arrangement of a display unit that is detachable from a connector.

The display unit 6 may be detachable from the connecting pipe 5. FIG. 10 is a perspective view of a preferred embodiment of the display unit 6 that is detachable from the connecting pipe 5. In the preferred embodiment shown in FIG. 10, a through-hole 6J is provided at sides of the display unit 6, while a through-hole 5_a_ is provided in the connecting pipe 5. A fastener 42 is inserted through the through-hole 6J of the display unit 6 and the through-hole 5_a_ of the connecting pipe 5. The fastener 42 fastens the display unit 6 and connecting pipe 5 together. Thus, the display unit 6 is fixed to the connecting pipe 5. The fastener 42 may include a bolt and a nut, for example. In other preferred embodiments, the fastener 42 has a male thread on its periphery and the through-holes 6J and 5_a_ have female threads on their inner surfaces such that the fastener is screwed into the through-holes.

Figure 11:
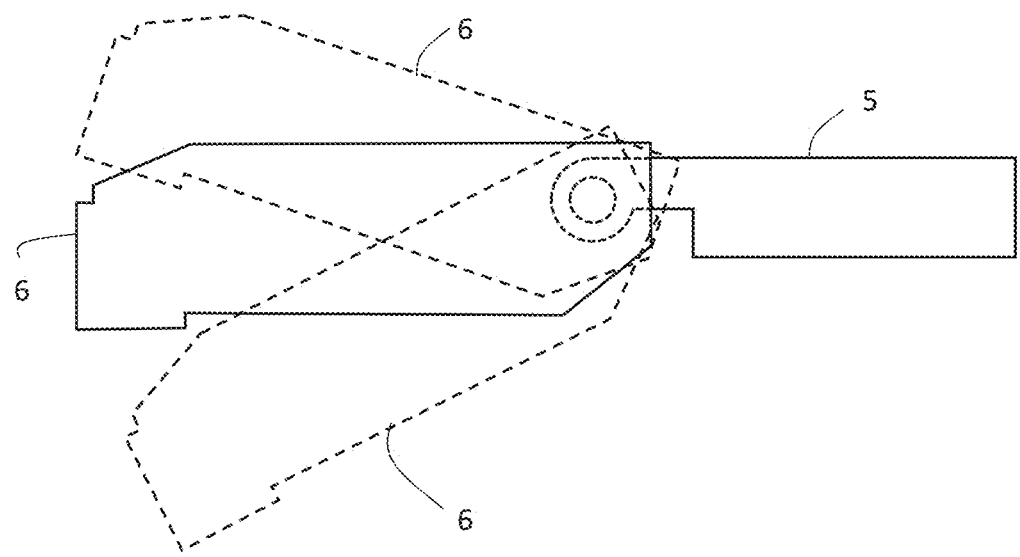
FIG. 11 is a side view of the display unit, illustrating an exemplary manner in which the position of the display unit is adjusted relative to the connector.

In the preferred embodiment shown in FIG. 10, the orientation (i.e., the angle) of the display surface 6_a_ of the display unit 6 relative to the connecting pipe 5 is adjustable. As shown in FIG. 11, the display unit 6 may be rotated about the axis of the through-hole 6J (i.e., the axis of the fastener 42) relative to the connecting pipe 5 and may be fixed at a desired rotational angle. This allows the position of the display surface 6_a_ to be changed relative to the connecting pipe 5. This further improves the degree of freedom of the position of the display unit. In the preferred embodiment of FIG. 10, the axis of the through-hole 5_a_ is perpendicular or substantially perpendicular to the axis of the connecting pipe 5. This allows the display surface 6_a_ to be fixed at a desired angle relative to a plane perpendicular or substantially perpendicular to the axis of the connecting pipe 5.

Various elements of the display apparatus 4 are not limited to the above-described shapes. In the above-described preferred embodiments, the connecting pipe 5 is shaped as a closed ring when viewed in an axial direction. Alternatively, the connecting pipe 5 may be shaped as an open ring. A portion of the ring formed by the connecting pipe 5 may be absent when viewed in an axial direction. In such preferred embodiments, the connecting pipe 5 may be such that the inner diameter of the ring is reduced using a fastener, for example. That is, the connecting pipe 5 may be mounted on a member coaxial with the steering axle 2 through clamping with a fastener.

In the above-described preferred embodiments, the connecting pipe 5 of the display apparatus 4 is attached to the steering axle 2. The connecting pipe 5 need not be attached to the steering axle 2, and may be attached to the stem, handlebars, or other members. Further, in the preferred embodiment shown in FIG. 8, the stem 3 is a threadless stem mounted on the steering axle 2 through clamping. Alternatively, a quill-type stem may be used. In such preferred embodiments, the connecting pipe 5 of the display apparatus 4 may be attached to the outer periphery of the stem, for example.

In the preferred embodiment shown in FIGS. 3 to 5, the display unit 6 is perpendicular or substantially perpendicular to the axis of the connecting pipe 5. The display unit 6 may be inclined relative to a plane perpendicular to the axis of the connecting pipe 5. For example, the display surface 6_a_ of the display unit 6 and the direction of depression of the buttons 7_a_ and 7_b_ may be inclined relative to a plane perpendicular to the axis of the connecting pipe 5. At least one of the buttons 7_a_ and 7_b_ may be switch type button.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A display apparatus for an electric motor-assisted bicycle, the display apparatus comprising:

a tubular connecting pipe coaxial with a steering axle of the electric motor-assisted bicycle;

a display extending outward from the connecting pipe in a radial direction of the connecting pipe, the display including a display surface to display a state of the electric motor-assisted bicycle; and a button located on a surface of the display different from the display surface; wherein a direction of a depression operation of the button includes a component in a direction perpendicular to an axis of the connecting pipe that is larger than a component in a direction of the axis of the connecting pipe;

an angle between the display surface and a plane perpendicular to an axial direction of the connecting pipe is about 0° to about 45°;

the display includes an upper surface, side surfaces, and a lower surface;

the upper surface includes the display surface;

the button is located on one side surface of the side surfaces;

at least a portion of a side surface that is located opposite to the one side surface having the button, as determined along the direction of depression, is connected to the connecting pipe; and as viewed in the direction perpendicular to the axis of the connecting pipe and perpendicular to the direction of the depression operation of the button, an imaginary line extending through a center of a depression surface of the button and in the direction of the depression operation intersects the connecting pipe but does not cross the display surface.

2. The display apparatus according to claim 1, wherein the display is able to display a display signal indicating a state of the electric motor-assisted bicycle on the display surface; and the display signal extends, as viewed in the axial direction of the connecting pipe, in an oblique direction relative to an imaginary line that extends through the axis of the connecting pipe and divides the display into two equal halves.

3. The display apparatus according to claim 1, wherein the button includes a plurality of buttons located on a same surface of the display; and the direction of the depression operation of each of the plurality of buttons is the same, and depression surfaces of the plurality of buttons are spaced apart from one another in the direction of the depression operation.

4. The display apparatus according to claim 1, further comprising:

a connection port to receive an external terminal and is located in or on a surface of the display different from the display surface; wherein a direction in which the external terminal is inserted/removed through the connection port includes a component in a direction perpendicular to the axis of the connecting pipe that is larger than a component in the direction of the axis of the connecting pipe.

5. The display apparatus according to claim 1, wherein the display surface of the display does not protrude from the connecting pipe upward along the axial direction of the connecting pipe.

6. The display apparatus according to claim 1, wherein the display is detachable from the connecting pipe.

7. The display apparatus according to claim 1, wherein an axial dimension of the connecting pipe is smaller than a radial dimension of the connecting pipe.

8. The display apparatus according to claim 1, wherein a circumferential position of the display about the steering axle is able to be adjusted by rotating the connecting pipe about the axis of the connecting pipe.

9. An electric motor-assisted bicycle comprising:

a head pipe;

a steering axle rotatably supported in the head pipe;

a stem attached to an upper portion of the steering axle;

a pair of handlebars supported by the stem; and a display apparatus including:

a tubular connecting pipe coaxial with a steering axle of the electric motor-assisted bicycle;

a display extending outward from the connecting pipe in a radial direction of the connecting pipe, the display including a display surface to display a state of the electric motor-assisted bicycle; and a button located on a surface of the display different from the display surface; wherein a direction of a depression operation of the button includes a component in a direction perpendicular to an axis of the connecting pipe that is larger than a component in a direction of the axis of the connecting pipe;

the connecting pipe of the display apparatus is mounted on an outer periphery of the steering axle or the stem;

an angle between the display surface and a plane perpendicular to an axial direction of the connecting pipe is about 0° to about 45°;

the display includes an upper surface, side surfaces, and a lower surface;

the upper surface includes the display surface;

the button is located on one side surface of the side surfaces;

at least a portion of a side surface that is located opposite to the one side surface having the button, as determined along the direction of depression, is connected to the connecting pipe; and as viewed in the direction perpendicular to the axis of the connecting pipe and perpendicular to the direction of the depression operation of the button, an imaginary line extending through a center of a depression surface of the button and in the direction of the depression operation intersects the connecting pipe but does not cross the display surface.

10. The electric motor-assisted bicycle according to claim 9, wherein an axial dimension of the connecting pipe is smaller than a radial dimension of the connecting pipe.

11. The electric motor-assisted bicycle according to claim 9, wherein a circumferential position of the display about the steering axle is able to be adjusted by rotating the connecting pipe about the axis of the connecting pipe.

* * * * *